(12) United States Patent
Clayton

(10) Patent No.: US 6,990,541 B2
(45) Date of Patent: Jan. 24, 2006

(54) ARBITRATION UNIT FOR PRIORITIZING REQUESTS BASED ON MULTIPLE REQUEST GROUPS

(75) Inventor: William A. Clayton, Milpitas, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 310 days.

(21) Appl. No.: 10/302,133

(22) Filed: Nov. 22, 2002

(65) Prior Publication Data

US 2004/0103232 A1 May 27, 2004

(51) Int. Cl.
*G06F 13/14* (2006.01)

(52) U.S. Cl. .................. 710/244; 710/113; 370/462

(58) Field of Classification Search ........ 710/240–244, 710/107, 41, 113, 309, 116; 709/253; 711/150–152; 370/462
See application file for complete search history.

(56) References Cited

U.S. PATENT DOCUMENTS

| | | | | |
|---|---|---|---|---|
| 5,761,452 A | * | 6/1998 | Hooks et al. | ............... 710/116 |
| 5,956,342 A | | 9/1999 | Manning et al. | |
| 6,286,083 B1 | * | 9/2001 | Chin et al. | .................. 711/151 |
| 6,487,213 B1 | | 11/2002 | Chao | |
| 6,584,531 B1 | | 6/2003 | Singh | |
| 6,718,422 B1 | * | 4/2004 | Kelley et al. | ............... 710/309 |
| 6,823,474 B2 | * | 11/2004 | Kampe et al. | ................. 714/13 |

FOREIGN PATENT DOCUMENTS

| | | |
|---|---|---|
| EP | 1041773 | 10/2000 |
| EP | 1052814 | 11/2000 |
| GB | 2334651 | 8/1999 |
| WO | 02/13446 | 2/2002 |

OTHER PUBLICATIONS

"A dual round-robin arbiter for split-transacttion buses in syste-on-chip implementations" by Reed, J.; Manjikian, N. (absrract only) Publication Date: May 2-5, 2004.*
"Performance model for prioritized multiple-bus multiprocesor system" by Kurian, L; Yu-Cheng Liu (abstract only) Publication Date: Oct. 26-29, 1994.*
International search report application No. GB0325014.9 mailed Mar. 1, 2004.
"Saturn: A Terabit Packet Switch Using Dual Round-Robin", Chao, *IEEE Communications Magazine*, Dec. 2000.
International search report application No. GB0425032.0 mailed Dec. 17, 2004.

* cited by examiner

*Primary Examiner*—Gopal C. Ray
(74) *Attorney, Agent, or Firm*—Meyertons Hood Kivlin Kowert & Goetzel, P.C.; B. Noël Kivlin

(57) ABSTRACT

An arbitration unit includes an input unit, a selection unit and an output unit. The input unit may receive a plurality of input requests on a plurality of inputs. The selection unit may prioritize inputs into a priority order and may also select up to two of the input requests having a higher priority than others of the plurality of input requests during a current arbitration cycle. The output unit may provide an output indicative of which of the plurality of input requests were selected. During a subsequent arbitration cycle, the selection unit may reprioritize the plurality of inputs depending upon which of the plurality of input requests were selected.

25 Claims, 5 Drawing Sheets

US 6,990,541 B2

ARBITRATION UNIT FOR PRIORITIZING REQUESTS BASED ON MULTIPLE REQUEST GROUPS

BACKGROUND OF THE INVENTION

1. Field of the Invention

This invention relates to computer systems and, more particularly, to arbitration mechanisms for selecting one or more inputs for output.

2. Description of the Related Art

Many systems use some mechanism to choose between two or more inputs. In some computer systems, a system controller may arbitrate a winning bus between two or more buses using a bus arbitration scheme. In a router system, a switching unit may choose to output a single winning input from multiple inputs using a round robin arbitration scheme, for example.

In a round robin arbiter having multiple inputs, the arbiter may choose to output a single winning input in a given cycle based upon some predefined selection order. Then on the next arbitration cycle, the winning input from the previous cycle may have the lowest priority. Thus, the arbiter may take turns sequentially selecting each input in successive cycles.

However, some systems may require more than one input to be selected in a given cycle. Thus, one method of selecting more than one input in a given cycle may be to use multiple parallel arbiters having different ordering rules. However, this may not be efficient in terms of gate counts or area, particularly when the arbiter is implemented on an integrated circuit.

SUMMARY OF THE INVENTION

Various embodiments of an arbitration unit are disclosed. In one embodiment, an arbitration unit includes an input unit, a selection unit and an output unit. The input unit may be configured to receive a plurality of input requests on a plurality of inputs. The selection unit is coupled to the input unit and may be configured to prioritize the plurality of inputs into a priority order. The selection unit may select up to two of the plurality of input requests having a higher priority than others of the plurality of input requests during a current arbitration cycle. The output unit is coupled to the selection unit and may be configured to provide an output indicative of which of the plurality of input requests were selected. During a subsequent arbitration cycle, the selection unit may reprioritize the plurality of inputs depending upon which of the plurality of input requests were selected.

In another embodiment, the arbitration unit includes an input unit, a selection unit and an output unit. The selection unit is coupled to the input unit and may be configured to prioritize the plurality of inputs into a priority order. The selection unit may select two or more of the plurality of input requests having a higher priority than others of the plurality of input requests during a current arbitration cycle.

Figure 1:
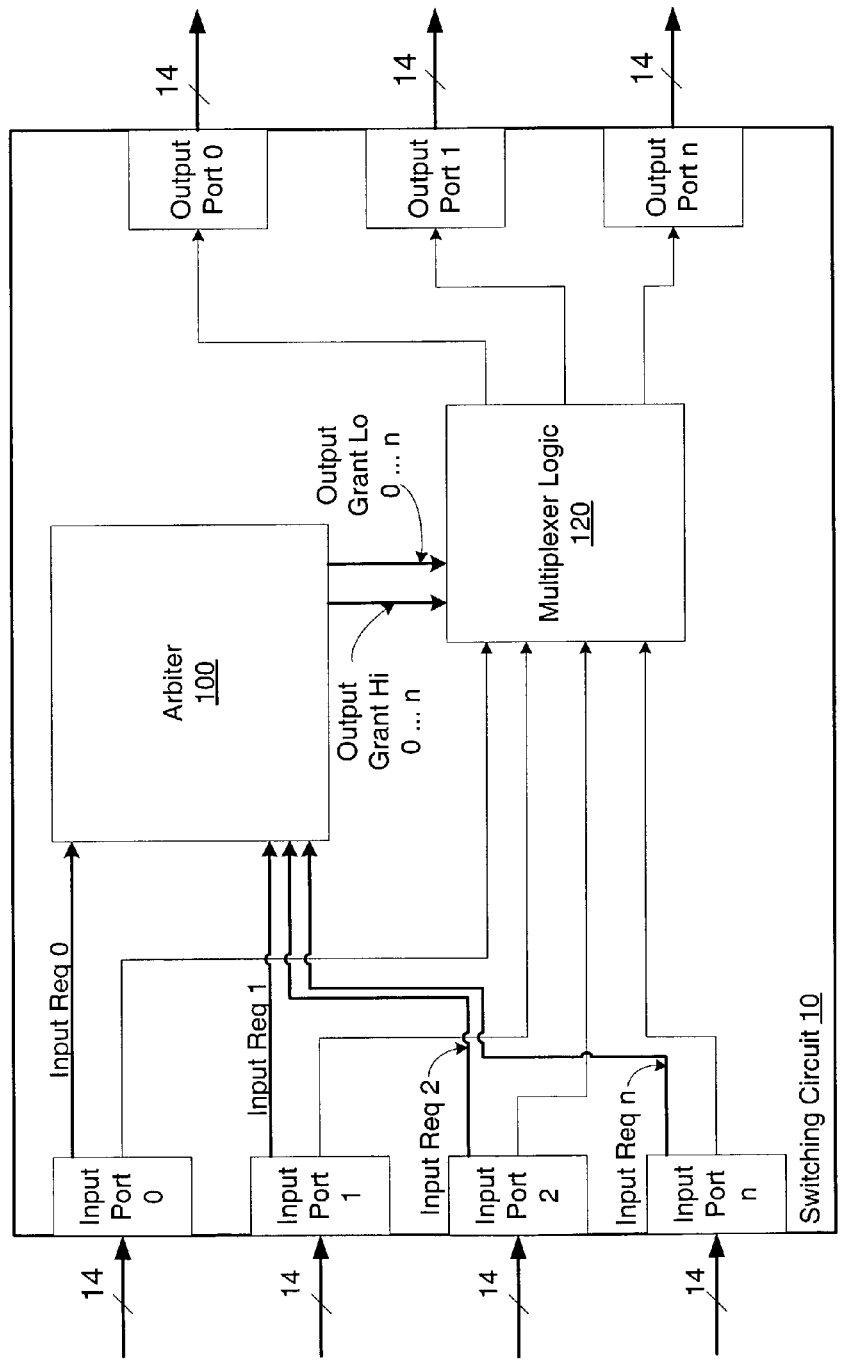
FIG. 1 is a block diagram of one embodiment of a switching circuit including an arbiter.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

DETAILED DESCRIPTION

Turning now to FIG. 1, a block diagram of one embodiment of a switching circuit including an arbiter is shown. Switching circuit 10 includes a plurality of input ports designated input port 0–n and a plurality of output ports designated output port 0–n. Switching circuit 10 may be configured to route incoming requests arriving at input ports 0–n to output ports 0–n. Switching circuit 10 also includes multiplexing logic 120 which is coupled between input ports 0–n and output ports 0–n. Further, switching circuit 10 includes an arbiter 100 coupled to multiplexer logic 120 and to input ports 0–n. It is noted that switching circuit 10 is an example of any type of switching circuit that may be employed in a variety of systems such as a router system, for example.

Input ports 0–n are configured to receive incoming requests such as address or data packets, for example. Each of input ports 0–n includes logic (not shown) which may provide an indication that a request is present on that input port. The indications are designated input request 0–n. The input request indications are routed from each input port, respectively, to arbiter 100. Each of input ports 0–n and output ports 0–n may have multiple signals. In the illustrated embodiment, each input port includes 14 signals, although other embodiments are contemplated that include other numbers of signals.

Multiplexer logic 120 is configured to route the incoming information (e.g. packets) received at input ports 0–n to output ports 0–n each cycle dependent upon which output ports are enabled and as will be described further below, which of input requests 0–n are selected by arbiter 100.

Arbiter 100 includes logic (not shown in FIG. 1) which is configured to prioritize input ports 0–n by establishing a priority order and to update and maintain a current priority state of input ports 0–n each cycle. As input requests are received, arbiter 100 is also configured to arbitrate between the received input requests based upon the current priority state. In one embodiment, arbiter 100 is configured to select up to two of the input requests for output by providing grant indications to multiplexer logic 120. As will be described in greater detail below in conjunction with the description of FIG. 2, arbiter 100 is further configured to maintain the priority order of the input requests relative to each other.

Output ports 0–n are configured to output the request information (e.g. packets) via whichever port or ports are selected by multiplexer logic 120.

Figure 2:
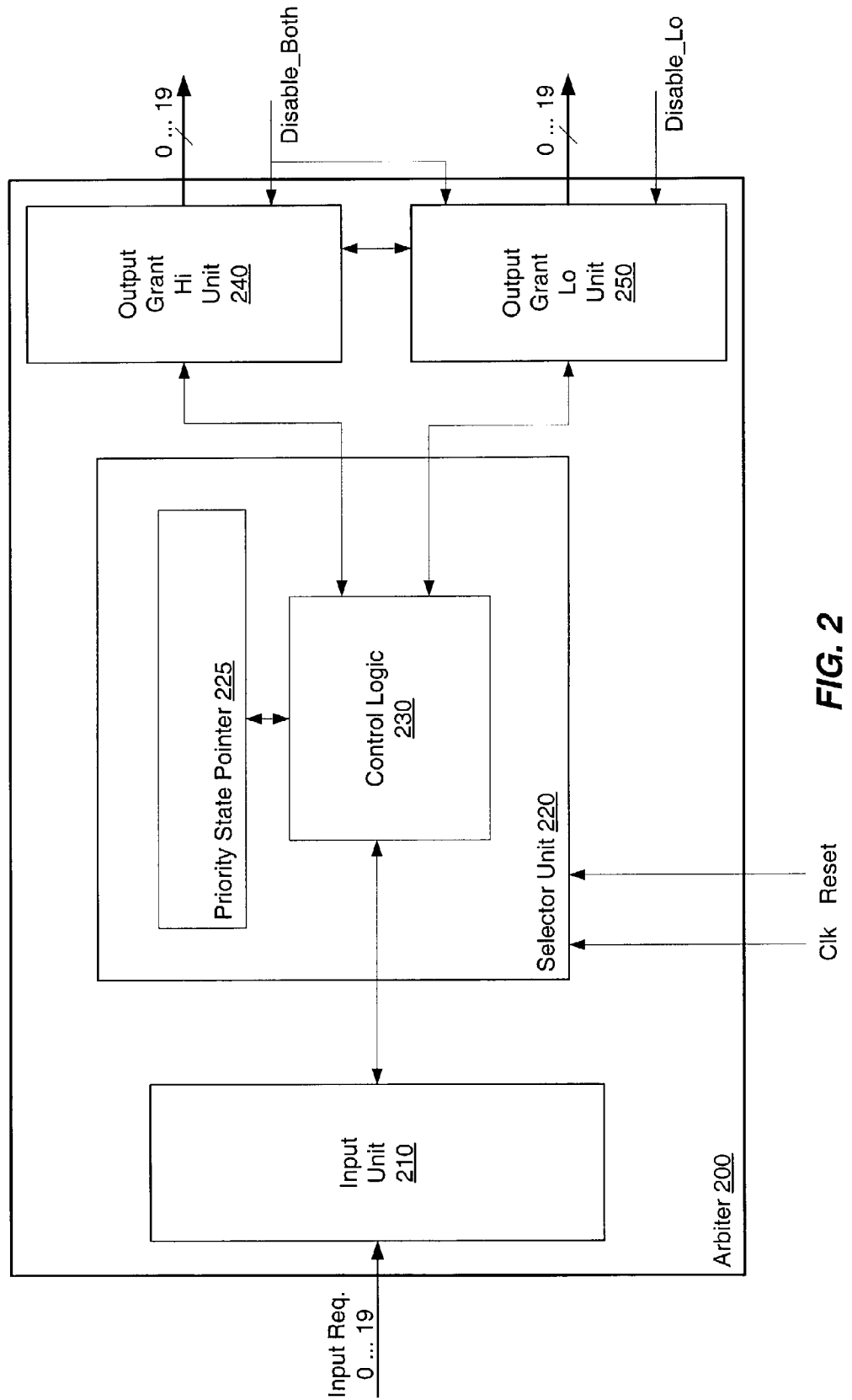
FIG. 2 is a block diagram of one embodiment of an arbiter.

Referring to FIG. 2, a block diagram of one embodiment of an arbiter is shown. Arbiter 200 includes an input unit 210 coupled to a selector unit 220. Input unit 210 is coupled to input requests 0–19. Input requests 0–19 are representative of 20 different input requests originating form 20 requesting input ports such as input ports 0–n of FIG. 1, for example. Selector unit 220 is coupled to output grant Hi unit 240 and output grant Lo unit 250. Output grant Hi unit 240 and output grant lo unit 250 are each coupled to 20 output grant signals. Further, output grant Lo unit 250 is coupled to a Disable_Lo signal and both output grant Lo unit 250 and output grant Hi unit 240 are coupled to a Disable_Both signal. Selector unit 220 is also coupled to a clock signal designated Clk and a Reset signal. It is noted that although 20 input request signals and 20 output grants for each output unit are shown, it is contemplated that in other embodiments, other numbers of input requests and other numbers of output grant signals may be used.

Input unit 210 is configured to receive input request indications from input ports such as input ports 0–n of FIG. 1, for example. Input unit 210 may latch the input requests and forward them to selector unit 220.

Selector unit 220 includes control logic 230 which is coupled to priority state pointer 225. Selector 220 may operate at the clock frequency of the clock signal received on the Clk input. Selector unit 220 may also receive a Reset signal. In response to receiving an active Reset signal, priority state pointer 225 is configured to be reset to zero which corresponds to input request zero. During operation, control logic 230 may cause priority state pointer 225 to be incremented up to the value 19, after which, priority state pointer 225 is configured to roll over to zero when incremented again. Priority state pointer 225 is configured to hold a value indicative of the highest priority input request for the next cycle.

Output grant Hi unit 240 is configured to receive notification from selector unit 220 of which of input requests 0–19 has the highest priority of the two selected winning input requests for a given cycle. Similarly, output grant Lo unit 250 is configured to receive notification from selector unit 220 of which of input requests 0–19 has the lower priority of the two selected winning input requests for a given cycle. Each output grant unit has an output bit corresponding to each input request. For example, since there are 20 input requests in the illustrated embodiment, each output grant unit may output a 20-bit grant vector, with each bit in the vector corresponding to one of the input requests. Further, both output grant units 240 and 250 are configured to register and output a logic one in the output bit corresponding to the winning input request number. Thus, each cycle the respective output vectors include 20 bits with only one bit being indicative of a selected winning input request. The output grant Hi unit 240 and the output grant Lo unit 250 may not output the same vector value in a given cycle. For example, in a given cycle, if input requests 2 and 3 are granted, then the output grant Hi and Lo vectors may be 00100000000000000000 and 00010000000000000000, respectively. It is noted that other embodiments are contemplated that output a logic zero in the output bit corresponding to the winning input request, while logic ones may be output for all other non-winning bits.

In response to receiving a Disable_Lo signal, output grant Lo unit 250 will not issue a grant and may output a value of 0 for each bit in the output vector, thereby making arbiter 200 a single-issue arbiter. In response to receiving an active Disable_Both signal, no grants will be issued from either output grant Hi unit 240 or output grant Lo unit 250.

As mentioned above, in one embodiment, arbiter 200 is configured to select up to two of the 20 input requests for output based upon the priority of the input requests in a given cycle: A high priority request and a low priority request. The high priority request is indicated by setting a bit in output grant Hi unit 240. If a second input request is present and selected, it is indicated by setting the appropriate bit in output grant Lo unit 250.

During operation, priority state pointer 225 maintains the priority state of the input requests by holding a count value corresponding to the high priority input request for the next cycle. The low priority input request is the next count value. Thus in one embodiment, after a reset, the count value in priority state pointer 225 is zero. This means that input request 0 has the high priority and input request 1 has the low priority. The remaining input requests all have lower priority than either 0 or 1. The priority order for such an embodiment may be 0, 1, 2, 3, . . . , 17, 18, 19, 0, 1, 2 . . . . This priority order may not change regardless of which input request is the current state high priority input request.

To maintain the priority order and thus correctly increment priority state pointer 225, the next priority state is dependent upon how many grants are issued in each cycle. For example, if two grants are issued the next priority state will be dependent upon which bit is set in the output vector of output grant Lo unit 250. Two grants may be issued if neither Disable signal is active and at least two input requests are received. Alternatively, if a single grant is issued, the next priority state will be dependent upon which bit is set in the output vector of output grant Hi unit 240. A single grant may be issued if the Disable_Lo signal is active and at least one input request is received or if the Disable_Lo signal is inactive and only a single input request is received. If no grants are issued in a given cycle, the priority state will not change. No grants may be issued if the Disable_Both signal is active or if no input requests are received in a given cycle.

Figure 3:
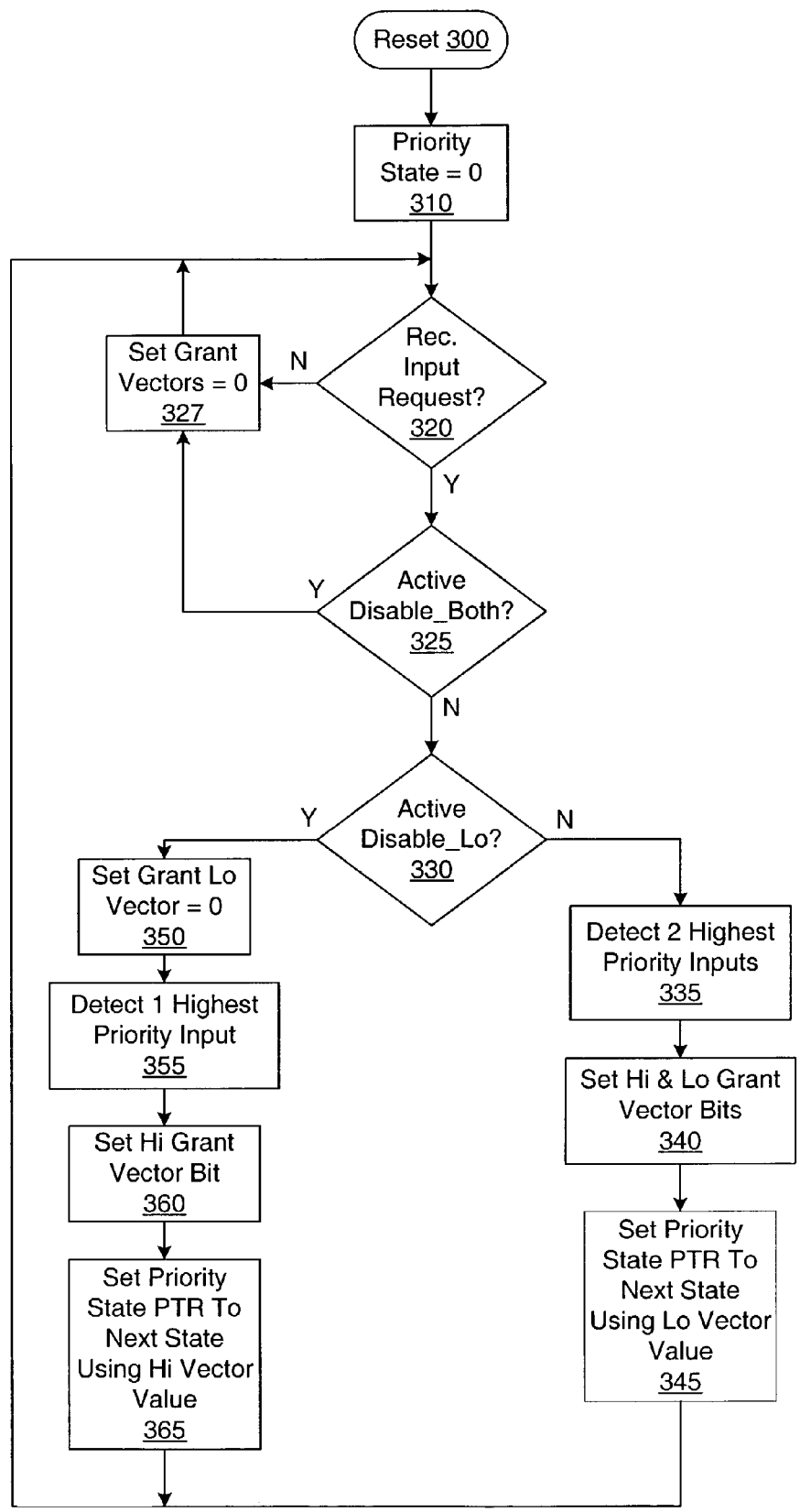
FIG. 3 is a flow diagram illustrating the operation of one embodiment of an arbiter.

Turning to FIG. 3, a flow diagram illustrating the operation of the embodiment of arbiter 200 of FIG. 2 is shown. Beginning with an active Reset signal, priority state pointer 225 of arbiter 200 is reset to a count value of zero (block 300, 310) and thus, a priority order is established and the inputs are prioritized. Input unit 210 receives and latches any input requests 0–19 from input ports 0–19 (block 320). Input unit 210 may then notify control logic 230 of the pending input requests. If there are no input requests, control logic 230 causes output grant Hi unit 240 and output grant Lo unit 250 to output vectors having all bits equal to zero (block 327). Control logic 230 checks for an active Disable_Both signal (block 325). If the Disable_Both signal is active, control logic 230 causes output grant Hi unit 240 and output grant Lo unit 250 to output vectors having all bits equal to zero (block 327). In this case, the value within priority state pointer 225 is not changed.

If the Disable_Both signal is inactive, control logic 230 checks for an active Disable_Lo signal (block 330). If the Disable_Lo signal is inactive, control logic 230 is configured to detect the two highest priority input requests that may be present at input unit 210 (block 335). Control logic 230 checks the value in priority state pointer 225 and starts verifying whether an input request is pending at the input request number corresponding to the count value. For example, the value in priority state pointer 225 out of reset is zero. Thus, control logic 230 may first check input request 0 and if there is no pending input request 0, control logic 230 may sequentially check each other input request.

When control logic 230 verifies the first two pending input requests, it sets a bit in output grant Hi unit 240 vector corresponding to the high priority input request (i.e. the first pending input request) and it sets a bit in output grant Lo unit 250 vector corresponding to the low priority input request (i.e. the second pending input request) (block 340).

Control unit 230 then reprioritizes the priority order by causing priority state pointer 225 to be incremented to the next priority state. Since in the example given above, two requests were granted, priority state pointer 225 is incremented to the next higher value than the input request number granted in the output grant Lo unit 250 (block 345). Thus, if the two requests that were granted were 0 and 1, priority state pointer 225 may be incremented to a value of 2.

Referring back to block 330, if the Disable_Lo signal is active, then control logic 230 causes output grant Lo unit 250 to output a vector having all bits equal to zero (block 350). Control logic 230 is configured to detect the highest priority input request that may be present at input unit 210 (block 355). Control logic 230 checks the value in priority state pointer 225 and starts at the input request number corresponding to the count value. For example, the value in priority state pointer 225 out of reset is zero. Thus, control logic 230 may first check input request 0 for a pending input request and if there is no pending input request 0, control logic 230 may sequentially check each other input request.

When control logic 230 verifies the first pending input request, it sets a bit in output grant Hi unit 240 vector corresponding to the high priority input request (i.e. the first pending input request) (block 360).

Control unit 230 then causes priority state pointer 225 to be incremented to the next priority state. Since in the example given above, one request was granted, priority state pointer 225 is incremented to the next higher value than the input request number granted in the output grant Hi unit 240 (block 365). Thus, if the request that was granted was 0, priority state pointer 225 may be incremented to a value of 1.

Since priority state pointer 225 is incremented to the next higher value than the low priority vector when two grants are issued and to the next higher value than the high priority vector when one grant is issued, the priority order of the input requests relative to each other is maintained.

Figure 4:
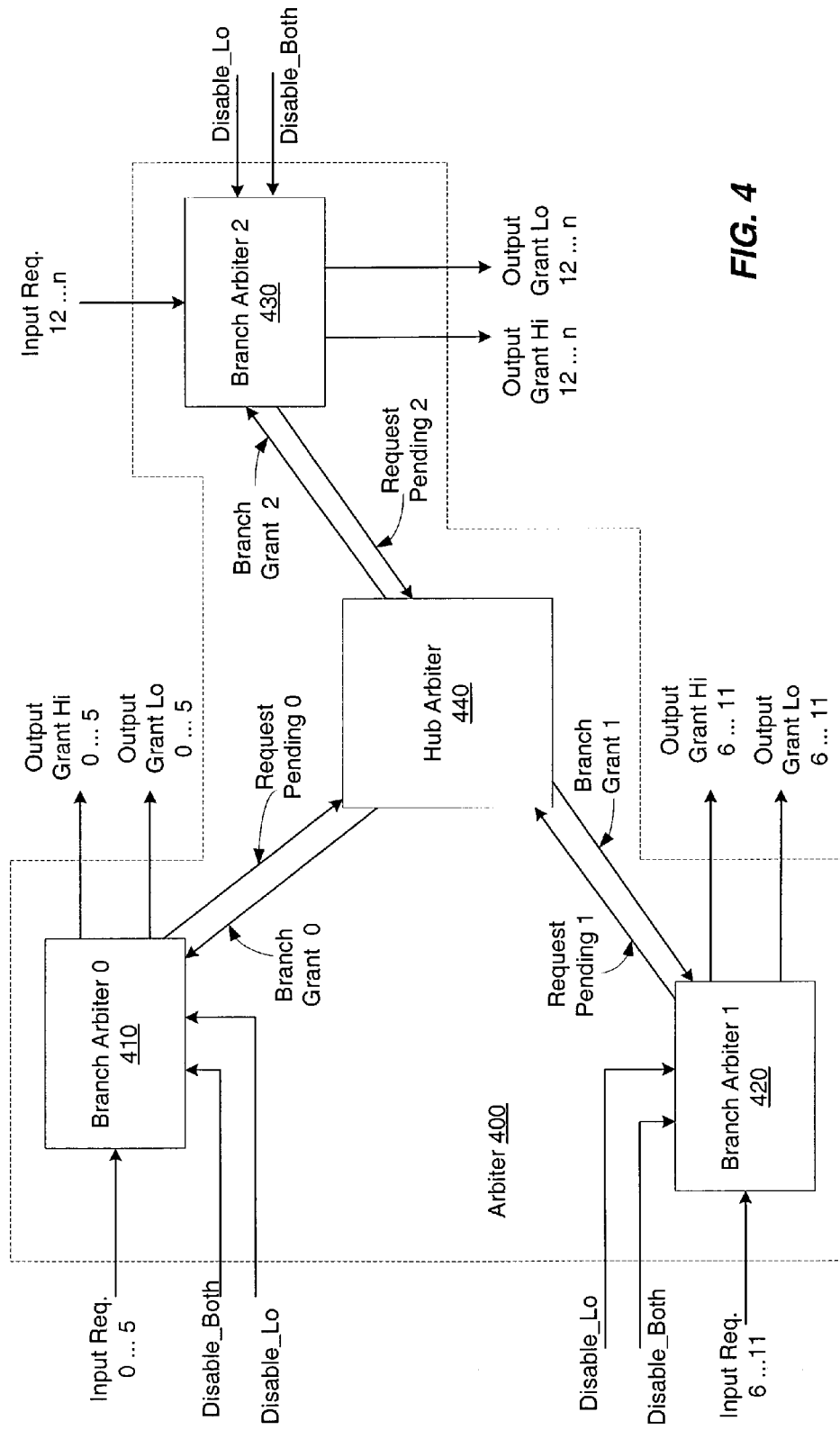
FIG. 4 is a block diagram of one embodiment of a hierarchically implemented arbiter.

Referring to FIG. 4, a block diagram of one embodiment of a hierarchical arbiter is shown. Arbiter 400 includes a hub arbiter 440 coupled to three branch arbiters 0, 1, and 2 and designated branch arbiter 410, branch arbiter 420 and branch arbiter 430, respectively. Branch arbiter 0 is coupled to input requests 0–5, output grant Hi 0–5 and output grant Lo 0–5. Branch arbiter 1 is coupled to input requests 6–11, output grant Hi 6–11 and output grant Lo 6–11. Branch arbiter 2 is coupled to input requests 12–n, output grant Hi 12–n and output grant Lo 12–n. Further, each branch arbiter is coupled to hub arbiter 440 via a respective request pending signal (e.g., request pending 0, 1, 2) and a respective branch grant signal (e.g., branch grant 0, 1, 2). It is noted that although three branch arbiters are shown, it is contemplated that other embodiments may have any number of branch arbiters to accommodate any number of input requests and their corresponding output grants. It is also noted that each of the request pending signals and each of the branch grant signals may be multi-bit signals capable of notifying hub arbiter 400 that a given branch arbiter has multiple active input requests.

Although flexible, the number of branch arbiters may be somewhat dependent on the number of input ports and corresponding output grants in a given system. The number of branches may be calculated by P=M*N, where P is the total number of input ports, M is the number of branch arbiters and N is the number of input ports assigned to each branch. Since gate counts and die area may be of concern when an arbiter such as arbiter 400 is implemented on an integrated circuit, a hierarchical approach may be used to decrease gate counts and thus, die area. Thus, the distribution of input ports per branch may be made based upon factors such as these.

In addition to die area savings, signal propagation times may be smaller using the hierarchical approach of arbiter 400, which may make the hierarchical arbiter faster due to the parallel hierarchy of the design. With respect to the input requests and the output grant vectors, arbiter 400 may perform a logical selection function similar to arbiter 200 of FIG. 2, such that when viewed as a black box, there may be no noticeable functional differences between arbiter 200 and arbiter 400 (i.e., it selects between a set of ports given a priority value). However, in the hierarchical implementation, hub arbiter 440 only has to select between M inputs. Likewise, each branch arbiter 410–430 only selects between N inputs. Since these two selections happen in parallel (e.g., branch arbiter signals to hub arbiter that it has valid requests, then selects between those requests while hub arbiter selects between branches, and enables its selection results based on hub arbiter's branch grants). The slowest selection path may be a choice between (the larger of N and M) ports.

Generally speaking, a branch arbiter such as arbiter 410, may send a request pending 0 notification to hub arbiter 440 in response to receiving one or more pending input requests on input requests 0–5. As noted above, request pending 0 may include multiple bits to indicate each request that is pending. In addition, branch arbiter 410 may arbitrate between any of pending requests on input requests 0–5 and generate corresponding output grant Hi and Lo vectors as described above in conjunction with the description of arbiter 200, although the respective grant vectors of branch arbiter 410 may include as many bits as there are input requests (e.g. 0 . . . 5). Similarly, branch arbiters 420 and 430 may also arbitrate their respective input requests and generate corresponding output grant Hi and Lo vectors.

Upon receiving a Request Pending signal from any branch arbiter, hub arbiter 440 may be configured to arbitrate between the request pending signals. When hub arbiter 440 selects a winner, hub arbiter 440 notifies the winning branch arbiter by sending a respective branch grant signal. As noted above, each respective branch grant signal may include multiple bits to indicate which requests may be granted. For example, in one embodiment, if the active requests are 0, 1 and 6, then hub arbiter 440 may need to know that branch arbiter 410 has multiple active requests. Hub arbiter 440 may direct branch arbiter 410 to enable both the output grant Hi and the output grant Lo vectors. However, if the active requests are only 0 and 6, then hub arbiter 440 may signal branch arbiter 410 to enable the output grant Hi, and branch arbiter 420 to enable the output grant Lo.

In response to receiving a branch grant signal, a given branch arbiter may, in one embodiment, enable the respective output grant vectors which were previously generated. In an alternative embodiment, a given branch arbiter may not generate the output grant vectors until receiving a branch grant signal.

Figure 6:
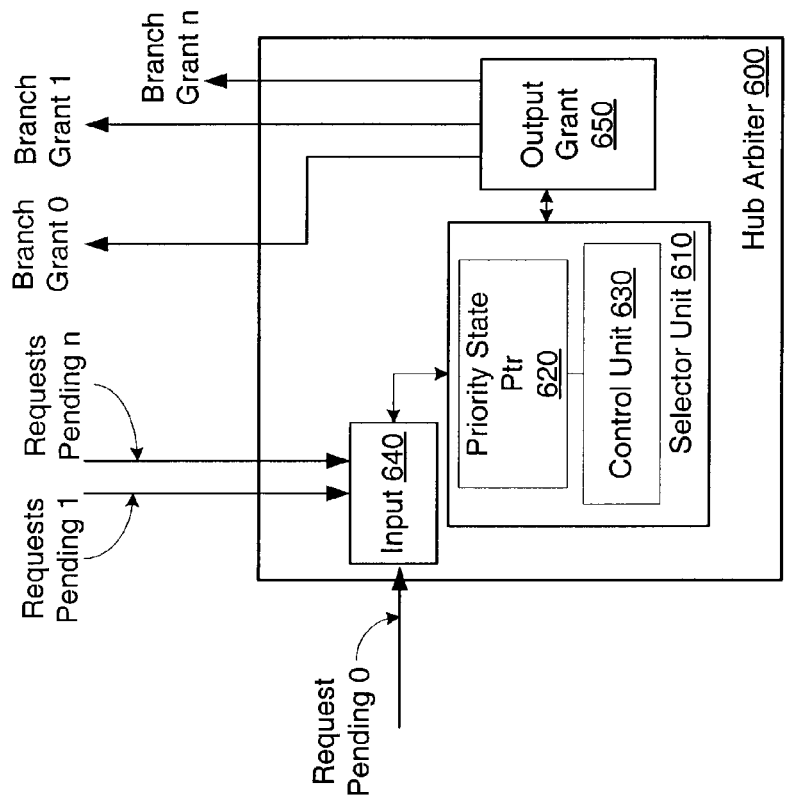
FIG. 6 is a block diagram of one embodiment of a hub arbiter of the hierarchically implemented arbiter of FIG. 4.
Figure 5:
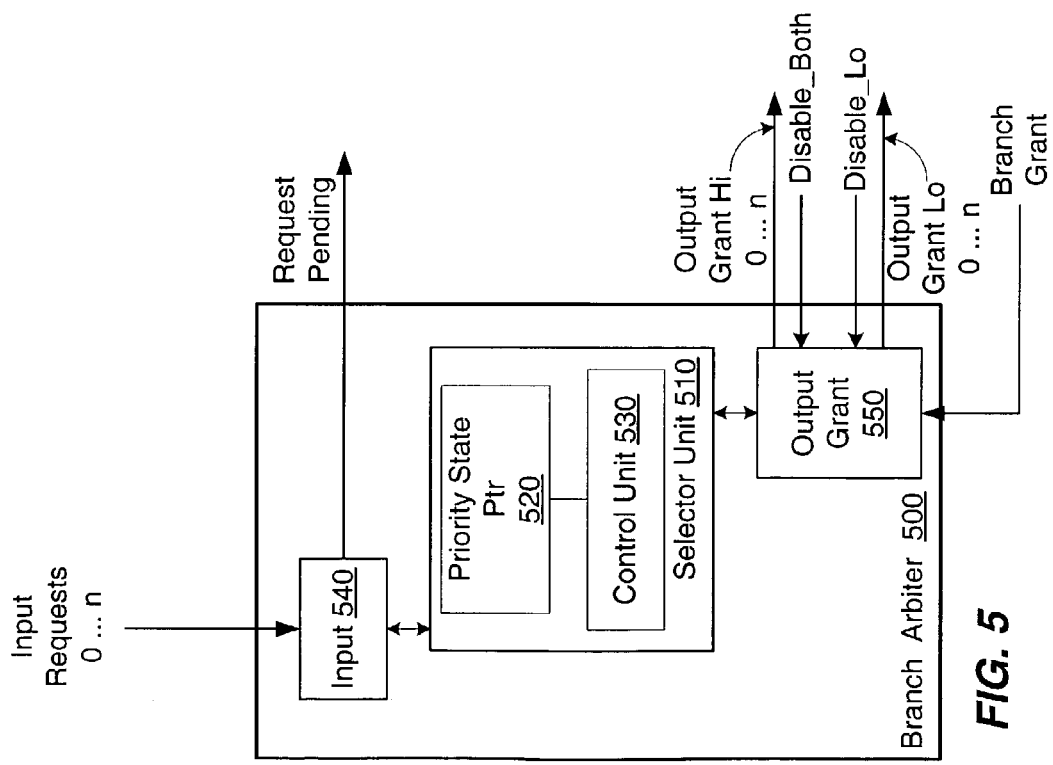
FIG. 5 is a block diagram of one embodiment of a branch arbiter of the hierarchically implemented arbiter of FIG. 4.

FIG. 5 illustrates an embodiment of a branch arbiter such as branch arbiter 410, for example, while FIG. 6 illustrates an embodiment of a hub arbiter such as hub arbiter 440, for example. Turning to FIG. 5, a block diagram of one embodiment of a branch arbiter is shown. Branch arbiter 500 includes an input unit 540 coupled to input requests 0–n and a request pending signal. Input unit 540 is also coupled to selector unit 510. Selector unit 510 is coupled to output grant unit 550. Output grant unit 550 is coupled to output grant Hi signals 0–n, output grant Lo signals 0–n and a Branch Grant signal.

Input unit 540 has similar functionality to input unit 210 of FIG. 2. Specifically, input unit 540 is configured to receive input request indications from input ports such as input ports 0–n of FIG. 1, for example. Input unit 210 may latch the input requests and forward them to selector unit 510. However in addition, input unit 540 is configured to provide a request pending signal when active input requests have been latched on input requests 0–n. It is noted that there may be any number of input request signals.

Selector unit 510 and its components priority state pointer 520 and control unit 530 have functionality similar to selector unit 220 of FIG. 2. For example, selector unit 510 includes a control unit 530 which is coupled to priority state pointer 520. In response to receiving an active Reset signal such as the Reset signal illustrated in FIG. 2, priority state pointer 520 is configured to be reset to zero which corresponds to input request zero. During operation, control unit 530 may cause priority state pointer 520 to be incremented up to the value n, after which, priority state pointer 520 is configured to roll over to zero when incremented again. Priority state pointer 520 is configured to hold a value indicative of the highest priority input request for the next cycle.

Likewise, output grant unit 550 has functionality similar to output grant Hi unit 240 and output grant Lo unit 250 of FIG. 2. Output grant unit 550 is configured to receive notification from selector unit 510 of which of input requests 0–n has the highest priority and the lower priority of the two selected winning input requests for a given cycle. Output grant unit 550 may output two grant vectors: one Hi and one Lo. Each vector has an output bit corresponding to each input request. For example, since there are n input requests in the illustrated embodiment, output grant unit may output an n-bit Output Hi grant vector and an n-bit Output Lo grant vector, with each bit in the vector corresponding to one of the input requests. Further, output grant units 550 is configured to register and output a logic one in the output bit corresponding to the winning input request number. Thus, each cycle the respective output vectors include n bits with only one bit being indicative of a selected winning input request. The output grant Hi vector and the output grant Lo vector may not be the same vector value in a given cycle.

In addition, output grant 550 is configured to enable and disable the output logic (not shown) from outputting output grant vectors Hi and Lo dependent upon whether an active Branch Grant signal is received. For example, in one embodiment, the respective output grant vectors may be generated but not output since the output logic within output grant unit 550 may be held in a reset condition thereby outputting all zeros. In an alternative embodiment, output grant unit 550 may wait to generate the output grant vectors until receiving a Branch Grant signal.

Branch arbiter 500 is therefore configured to receive input requests 0–n and to arbitrate between them. Branch arbiter 500 is further configured to output the respective output grant vectors in response to receiving an active Branch Grant signal.

Referring to FIG. 6, a block diagram of a hub arbiter is shown. Hub arbiter 600 includes an input unit 640 coupled to Request Pending signals 0–n and to a selector unit 610. Selector unit 610 is coupled to an output grant unit 650. Output grant unit 650 is coupled to Branch Grant signals 0–n. It is noted that any number of Pending Request signals may be coupled to input unit 640 and a corresponding number of Branch Grant signals may be output from output grant unit 650.

Input unit 610 is configured to receive and latch Pending Request signals 0–n. Input unit 610 is also configured to provide an indication of which Pending Request signals are active in each cycle.

Selector unit 610 is configured to arbitrate between active Pending Request signals 0–n and to select a winning Request each cycle. Selector unit 610 functions similar to selector unit 210 of FIG. 2. For example, selector unit 610 includes a control unit 630 which is coupled to priority state pointer 620. In response to receiving an active Reset signal such as the Reset signal illustrated in FIG. 2, priority state pointer 620 is configured to be reset to zero which corresponds to Request Pending zero. During operation, control unit 630 may cause priority state pointer 620 to be incremented up to the value n, after which, priority state pointer 520 is configured to roll over to zero when incremented again. The number n is corresponds to any value. Priority state pointer 620 is configured to hold a value indicative of the highest priority input request for the next cycle. Similar to the output grant vectors described above, in response to selecting a winning request, selector unit 610 may cause output grant unit 650 to output a grant vector having a bit set which corresponds to the branch grant.

Output grant unit 650 is configured to output a grant vector having a bit corresponding to each of the incoming Request pending signals. When a winning pending request has been selected, output grant unit 650 causes a logic value of one to be set in the bit position corresponding to the winning pending request. Each other bit may be cleared to a logic value of zero. As described above, while the grant vector contains all zeros, it may be indicative that no grants have been issued. It is contemplated that in other alternative embodiments, a logic value of zero may be indicative of a winning request and if the grant vector contains all ones it may be indicative that no grants have been issued.

It is noted that the above embodiments describe arbitration units which may select up to two input requests during a given arbitration cycle. It is contemplated however that in other embodiments, other numbers of input requests may be selected in a given arbitration cycle. For example, in one embodiment, an arbitration unit may select a high, medium and low priority input request.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An arbitration unit comprising:
an input unit configured to receive a plurality of input requests on a plurality of inputs;
a selection unit coupled to said input unit and configured to prioritize said plurality of inputs into a priority order and during a current arbitration cycle to select up to two of said plurality of input requests having a higher priority than others of said plurality of input requests; and
an output unit coupled to said selection unit and configured to provide an output indicative of which of said up to two of said plurality of input requests were selected;
wherein upon a subsequent arbitration cycle, said selection unit is further configured to reprioritize said plurality of inputs depending upon which of said up to two of said plurality of input requests were selected.

2. The arbitration unit as recited in claim 1, wherein said selection unit is further configured to reprioritize said plurality of inputs such that during said subsequent arbitration cycle said inputs corresponding to said selected input requests and any other of said plurality of inputs having a higher priority than said selected input requests have a lower priority than all others of said plurality of inputs while maintaining a relative priority order.

3. The arbitration unit as recited in claim 2, wherein one input request of said up to two of said plurality of input requests has a high priority and another of said up to two of said plurality of input requests has a low priority.

4. The arbitration unit as recited in claim 3, wherein said selection unit includes a state pointer configured to hold a value corresponding to one of said plurality of inputs having a higher priority than all others of said plurality of inputs.

5. The arbitration unit as recited in claim 4, wherein said selection unit further includes a control unit coupled to said priority pointer and is configured to store said value within said state pointer.

6. The arbitration unit as recited in claim 5, wherein said selection unit is configured to select said up to two of said plurality of input requests dependent upon a first and a second selection control signal.

7. The arbitration unit as recited in claim 6, wherein said control unit is further configured to calculate said value by adding one to a number corresponding to said low priority input request in response to said selection unit selecting two of said plurality of input requests.

8. The arbitration unit as recited in claim 6, wherein said control unit is further configured to calculate said value by adding one to a number corresponding to said high priority input request in response to said selection unit selecting one of said plurality of input requests.

9. The arbitration unit as recited in claim 6, wherein in response to selecting none of said plurality of input requests, said selection unit is configured to not reprioritize said plurality of inputs.

10. A method of arbitrating a plurality of input requests received on a plurality of groups of inputs, said method comprising:
   prioritizing each of said plurality of groups of inputs into a first priority order;
   selecting up to two of said plurality of input requests within each group having a higher priority than others of said plurality of input requests based upon said first priority order;
   receiving an indication indicative of said plurality of input requests within a group and prioritizing said indications into a second priority order;
   selecting one of said plurality of groups of inputs based upon said second priority order and providing a grant indication indicative of which of said plurality of groups of inputs was selected; and
   providing an output indicative of which of said plurality of input requests was selected in response to receiving said grant indication.

11. The method as recited in claim 10 further comprising reprioritizing said plurality of inputs such that during a subsequent arbitration cycle said inputs corresponding to said selected input requests and any other of said plurality of inputs having a higher priority than said selected input requests have a lower priority than all others of said plurality of inputs while maintaining a relative priority order.

12. An arbitration unit for arbitrating a plurality of input requests received on a plurality of groups of inputs, said arbitration unit comprising:
   means for prioritizing each of said plurality of groups of inputs into a first priority order;
   means for selecting up to two of said plurality of input requests within each group having a higher priority than others of said plurality of input requests based upon said first priority order;
   means for receiving an indication indicative of said plurality of input requests within a group and ordering said indications into a second priority order;
   means for selecting one of said plurality of groups of inputs based upon said second priority order and providing a grant indication indicative of which of said plurality of groups of inputs was selected; and
   means for providing an output indicative of which of said plurality of input requests was selected in response to receiving said grant indication.

13. An arbitration unit comprising:
   an input unit configured to receive a plurality of input requests on a plurality of inputs;
   a selection unit coupled to said input unit and configured to prioritize said plurality of inputs into a priority order and during a current arbitration cycle to select two or more of said plurality of input requests having a higher priority than others of said plurality of input requests; and
   an output unit coupled to said selection unit and configured to provide an output indicative of which of said two or more of said plurality of input requests were selected;
   wherein upon a subsequent arbitration cycle, said selection unit is further configured to reprioritize said plurality of inputs depending upon which of said two or more plurality of input requests were selected.

14. The arbitration unit as recited in claim 13, wherein said selection unit is further configured to reprioritize said plurality of inputs such that during said subsequent arbitration cycle said inputs corresponding to said selected input requests and any other of said plurality of inputs having a higher priority than said selected input requests have a lower priority than all others of said plurality of inputs while maintaining a relative priority order.

15. An arbitration unit comprising:
   an input unit configured to receive a plurality of input requests on a plurality of inputs;
   a selection unit coupled to said input unit and configured to prioritize said plurality of inputs into a priority order and during a current arbitration cycle, in response to particular combinations of inputs, to select at least two of said plurality of input requests having a higher priority than others of said plurality of input requests; and
   an output unit coupled to said selection unit and configured to provide an output indicative of which of said at least two of said plurality of input requests were selected;
   wherein upon a subsequent arbitration cycle, said selection unit is further configured to reprioritize said plurality of inputs depending upon which of said at least two of said plurality of input requests were selected.

16. The arbitration unit as recited in claim 15, wherein said selection unit is configured to select said at least two of said plurality of input requests in response to said particular combinations of inputs including said plurality of input requests being received on at least two of said plurality of inputs.

17. The arbitration unit as recited in claim 15, wherein said selection unit is configured to select less than two of said plurality of input requests in response to said particular combinations of inputs including said plurality of input requests being received on less than two of said plurality of inputs.

18. The arbitration unit as recited in claim 17, wherein said selection unit includes a state pointer configured to hold a value corresponding to one of said plurality of inputs having a higher priority than all others of said plurality of inputs.

19. The arbitration unit as recited in claim 18, wherein said selection unit further includes a control unit coupled to said priority pointer and is configured to store said value within said state pointer.

20. The arbitration unit as recited in claim 19, wherein said selection unit is configured to select said at least two of said plurality of input requests dependent upon a first and a second selection control signal.

21. The arbitration unit as recited in claim 18, wherein said control unit is further configured to calculate said value by adding one to a number corresponding to said low priority input request in response to said selection unit selecting two of said plurality of input requests.

22. The arbitration unit as recited in claim 18, wherein said control unit is further configured to calculate said value by adding one to a number corresponding to said high priority input request in response to said selection unit selecting one of said plurality of input requests.

23. The arbitration unit as recited in claim 18, wherein in response to selecting none of said plurality of input requests, said selection unit is configured to not reprioritize said plurality of inputs.

24. The arbitration unit as recited in claim 15, wherein said selection unit is further configured to reprioritize said plurality of inputs such that during said subsequent arbitration cycle said inputs corresponding to said selected input requests and any other of said plurality of inputs having a higher priority than said selected input requests have a lower priority than all others of said plurality of inputs while maintaining a relative priority order.

25. The arbitration unit as recited in claim 15, wherein one input request of said at least two of said plurality of input requests has a high priority and another of said at least two of said plurality of input requests has a low priority.

\* \* \* \* \*